United States Patent [19]

Sandor et al.

[11] 4,166,626
[45] Sep. 4, 1979

[54] RECORD CLEANER

[75] Inventors: Joseph Sandor, Reseda; Claude P. Davis, Woodland Hills, both of Calif.

[73] Assignee: California Sounds, Ltd., Tarzana, Calif.

[21] Appl. No.: 863,897

[22] Filed: Dec. 23, 1977

[51] Int. Cl.$^2$ .............................................. G11B 3/58
[52] U.S. Cl. ...................... 274/47; 401/193; 401/206; 401/264; 401/273
[58] Field of Search .................. 274/47; 401/193, 186, 401/205, 206, 264, 273

[56] References Cited

U.S. PATENT DOCUMENTS

| 3,355,177 | 11/1967 | King | 274/47 |
| 3,486,757 | 12/1969 | Loescher | 274/47 |
| 3,653,779 | 4/1972 | Schwartzman | 401/206 |

FOREIGN PATENT DOCUMENTS

| 46116 | 1/1911 | Austria | 401/273 |
| 982599 | 2/1965 | United Kingdom | 274/47 |

Primary Examiner—Richard E. Aegerter
Assistant Examiner—John W. Shepperd

[57] ABSTRACT

A record cleaning device for cleaning, conditioning and rendering the surface of a phonograph record substantially static-free is disclosed. The device comprises an elongated arm member having a cleaning brush disposed on one side thereof. The cleaning brush is adapted to engage and clean the surface of a record so as to remove dirt and other undesirable material therefrom. A valve is disposed on the other side of the arm member for regulating the flow of a cleaning fluid through the arm member and to the cleaning brush. In this manner, cleaning, as well as conditioning of the phonograph record is achieved. Further, it has been found that the device applies the cleaning fluid in such a manner as to render the surface of the record substantially static-free. A rotatable member is also coupled to the arm member adjacent the valve such that the device can be selectively rotated about the record to be cleaned in an easy and efficient manner. By use of the device of the present invention, phonograph records of varying sizes can be efficiently cleaned, conditioned and rendered substantially static-free.

9 Claims, 4 Drawing Figures

RECORD CLEANER

BACKGROUND OF THE INVENTION

1. Field of the Invention

The present invention relates to the field of devices for use in connection with phonograph records, and more specifically, to a device for providing a phonograph record with a cleaned, conditioned, and static-free playing surface.

2. Prior Art

The advancements made in today's high fidelity phonograph systems have brought sound reproduction to an extremely high level. However, because such systems are of such quality and accuracy, should the grooves of a typical record contain even minor amounts of dirt, either in the form of particles of dust, smoke, and/or other undesirable material, the presence of such material can be picked up by the phonograph stylus, magnified, and heard through the speakers. Further, modern records are very susceptible to static electricity which causes dust and dirt to adhere to the surface thereof. Moreover, because modern records have highly polished surfaces and, for a variety of other reasons, are now able to carry much more information, the need to keep the surfaces of such records extremely clean is even more compelling.

While the problems caused by dirt in the grooves of phonograph records have been recognized in the industry for some time, the means to effectively remove dirt from the relatively fragile surface of the record has been elusive. However, recently there has been a proliferation of devices which have attempted to remove the undesireable material from the grooves of the record. In these devices, various cleaning brushes, both with and without cleaning solutions, are used to clean the phonograph record. One such device is marketed under the name "Vac-O-Rec". This device removes dust from the phonograph record by applying a vacuum brush system to the surface thereof.

Another record cleaning device is sold by the Discwasher Company. In the Discwasher device, a brush is used with about three drops of a cleaning fluid. The fluid is applied both to the surface of the stylus, as well as to a brush which can be swept back and forth across the phonograph record. Yet another device is sold under the name "Lenco-Clean Systems" which contains an arm with a storage reservoir attached to the stylus and applied to the record via a small plastic brush.

While all of the above devices do tend to clean the record somewhat, it has been found that they all contain a number of shortcomings. For example, many of the above-referenced devices are extremely complexed to mount onto the stylus and/or stylus arm, and can otherwise interfere with the travel of the record on the record player. Further, it has been determined that there are three basic problems to be considered in the care and handling of phonograph records. These include cleaning the record for better sound reproduction in which the above-identified devices tend to perform satisfactorily. It is also necessary that the record be conditioned such that less wear of the stylus on the record grooves is achieved. Conditioning of the record usually requires that a liquid composition be applied. While some of the above-identified devices condition the records, they do so at the expense of proper cleaning of the grooves. Thirdly, the phonograph record should be rendered substantially static-free so as to eliminate the buildup of dust which is attracted by static electricity to the surface thereof. Again, while some of the above devices do tend to render the surface of a record static-free, they do so at the expense of proper cleaning and/or conditioning.

The present invention overcomes the problems associated with the prior art devices and provides a device that not only cleans the record, but also conditions it and renders it substantially static-free. Further, the device of the present invention is relatively simple to produce, easy to use, and contains none of the complexities associated with the prior art devices.

BRIEF SUMMARY OF THE INVENTION

The present invention relates to phonograph record cleaning devices, and mores specifically, to a phonograph cleaning device which removes dirt, dust and other undesirable material from the surface of a phonograph record and which also conditions the surface of the record and renders it substantially static-free. The device of the present invention comprises an elongated arm member having a cleaning brush disposed on one side thereof. The cleaning brush, in the preferred embodiment, has a foam core and outwardly extending bristles attached to the core. The brush is mounted in an associated and removable brush carrier which is selectively disposed on the arm member. The carrier has a plurality of holes passing therethrough so as to permit a cleaning fluid to enter into the foam and flow to the bristles. A valve is axially disposed in a housing and is coupled to the other side of the arm member. The valve regulates the flow of the cleaning fluid to the cleaning brush along a pathway formed in the arm member. Finally, a rotatable member is coupled to the arm member such that the device can be selectively rotated about a record to be cleaned. The rotatable member is axially disposed about the housing and the valve.

In using the device of the present invention, a fluid reservoir containing a cleaning fluid is selectively joined to the rotatable member. Depressing the rotatable member causes the valve the open and thus permits the cleaning fluid to flow through the arm member, through the holes in the carrier, and into the foam core of the cleaning brush. Because the device further includes the means for attaching the device to the spindle of a record player, the device may be easily rotated about the surface of the record thereby applying the cleaning fluid to the surface thereof. Further, the bristles are adapted to enter into the grooves of the record and thus remove dirt, dust, and other undesirable material. By the use of the present invention, cleaning, conditioning, and static protection are achieved.

The novel features which are believed to be characteristic of the invention, both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

DETAILED DESCRIPTION OF THE INVENTION

Figure 1:
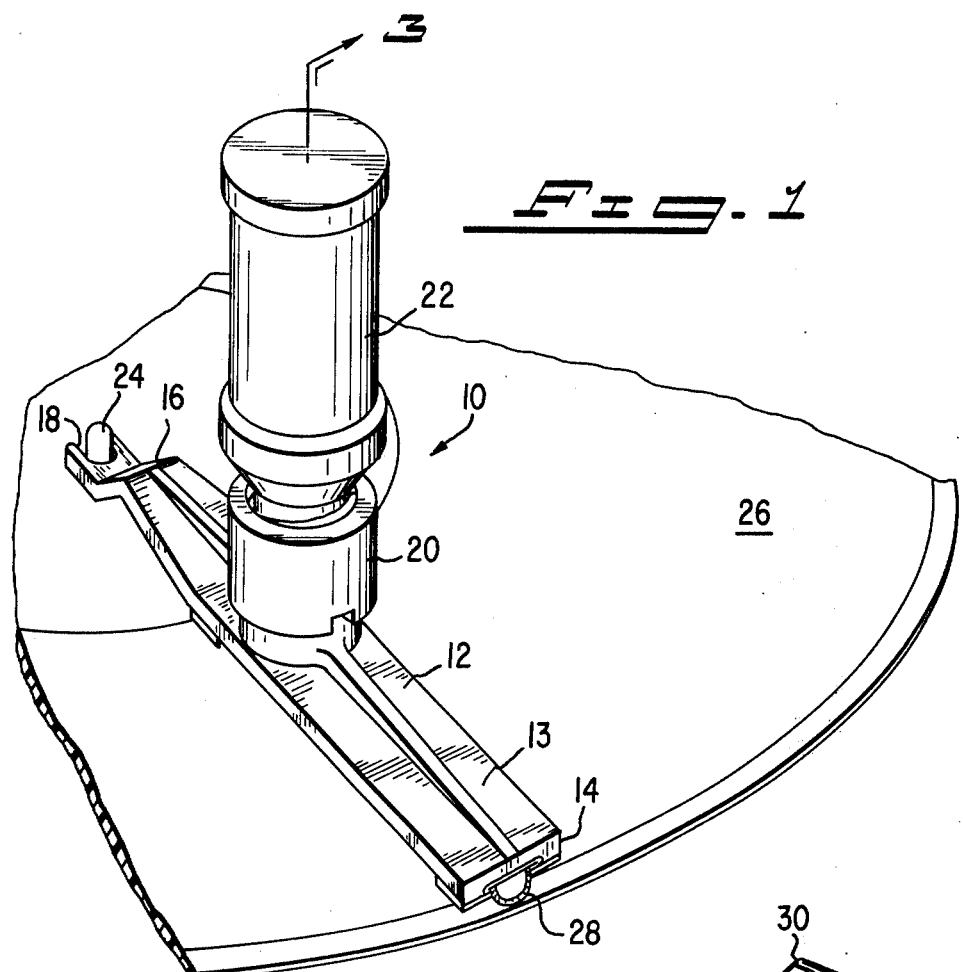
FIG. 1 is a perspective view showing the device of the present invention engaging a phonograph record.

Referring first to FIG. 1, the novel record cleaning device is clearly shown. The device 10 includes an elongated arm member 12 having a first end 14 and a second end 16. The arm member 12 further includes a first upper surface 13 and a second lower surface 15. A notch or groove 18 is disposed in the arm member 12 adjacent second end 16 and is adapted to selectively engage a spindle 24 such as is typically used to mount a record on well known record players. A cylindrically shaped, rotatable member 20 is rotatably coupled to the arm member 12 and thus permits the arm member 12 to be rotated about record 26 such that a cleaning brush 28 can clean, condition, and statically protect the record 26 as hereinafter more fully discussed.

Figure 2:
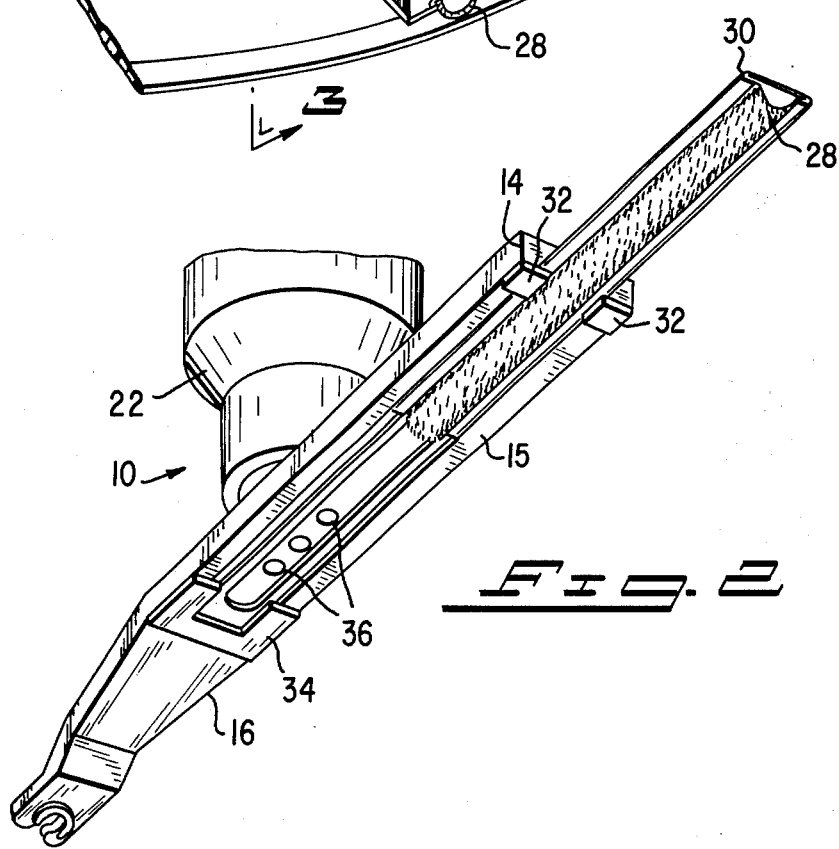
FIG. 2 is a bottom perspective view of the device of the present invention showing the cleaning brush.

Referring now to FIG. 2, one can see that the device 10 has a fluid container or a reservoir 22 coupled thereto which supplies the cleaning brush 28 with a cleaning fluid. The cleaning fluid can utilize a number of different ingredients including isopropyl alcohol and freon. It has been found that freon acts as the conditioning agent and that isopropyl alcohol acts as a good cleaning solution for removing dirt and other undesirable material from the surface of the record. Of course, it is understood that other cleaning and conditioning agents are also within the scope of the invention.

Disposed on the lower surface 15 of the arm 12 is a carrier 30 which has been slid outward in FIG. 2 to better illustrate the invention. The carrier 30 retains the cleaning brush 28 therein, and is slideably disposed on the arm 12. More specifically, carrier 30 is retained in arm 12 by means of grip members 32 disposed at the first end 14 as well as by U-shaped member 34 which also acts as a grip means adjacent the second end 16. Members 32 and 34 form two slots on the arm member 12 and grasp the carrier 30 at opposite ends such that the carrier 30 is sildably removable should one desire to change the carrier 30 for cleaning purposes and the like.

Also shown in FIG. 2 are a plurality of openings 36 which are disposed on the arm member 12 through the lower surface 15 thereof. Openings 36 permit the cleaning fluid from the reservoir 22 to flow from the reservoir 22 to the cleaning brush 28. In the preferred embodiment, cleaning brush 28 is coupled to the arm 12 such that one end of the brush 28 is disposed beneath and adjacent to openings 36.

Figure 3:
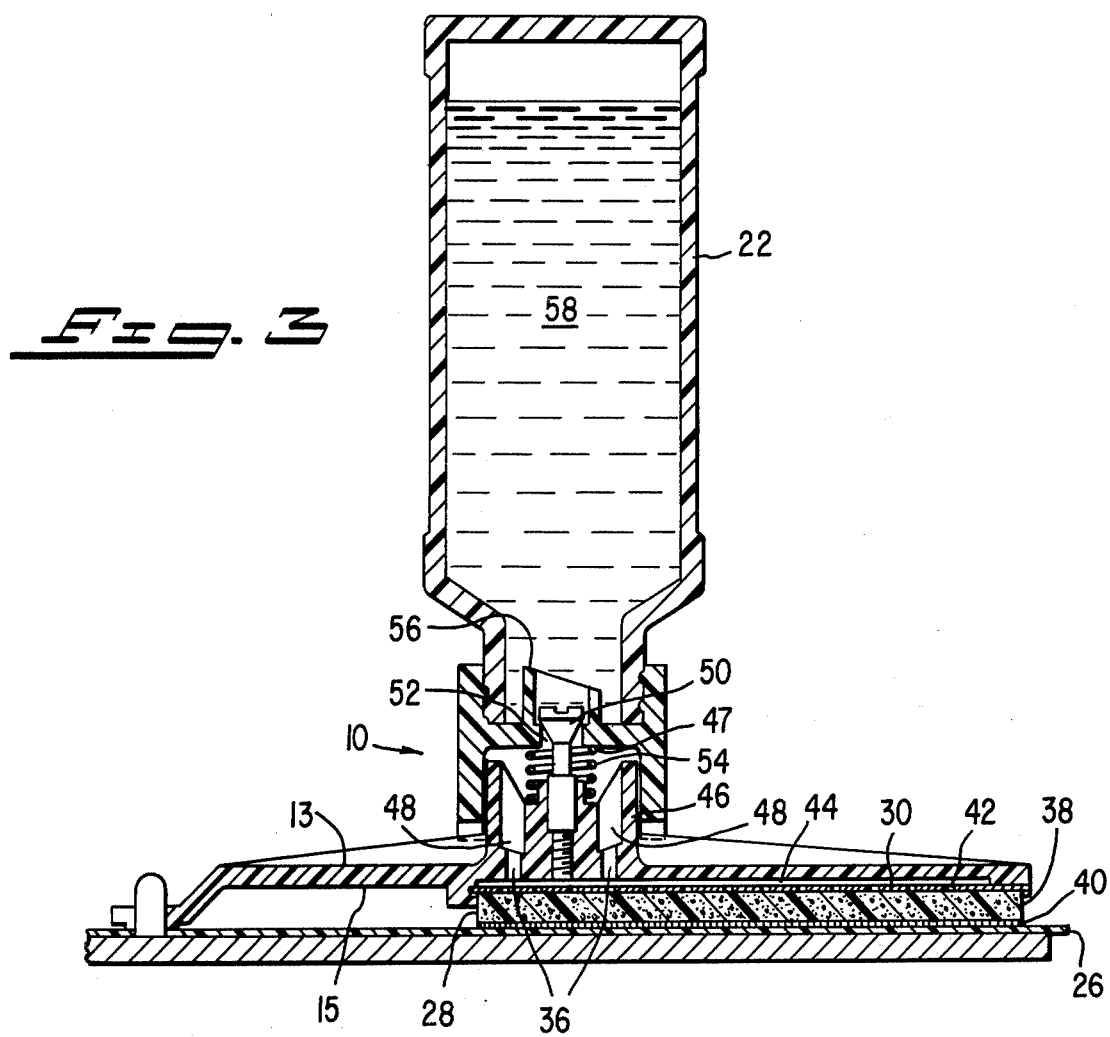
FIG. 3 is a front cut-away view of the device of the present invention showing the internal members thereof.
Figure 4:
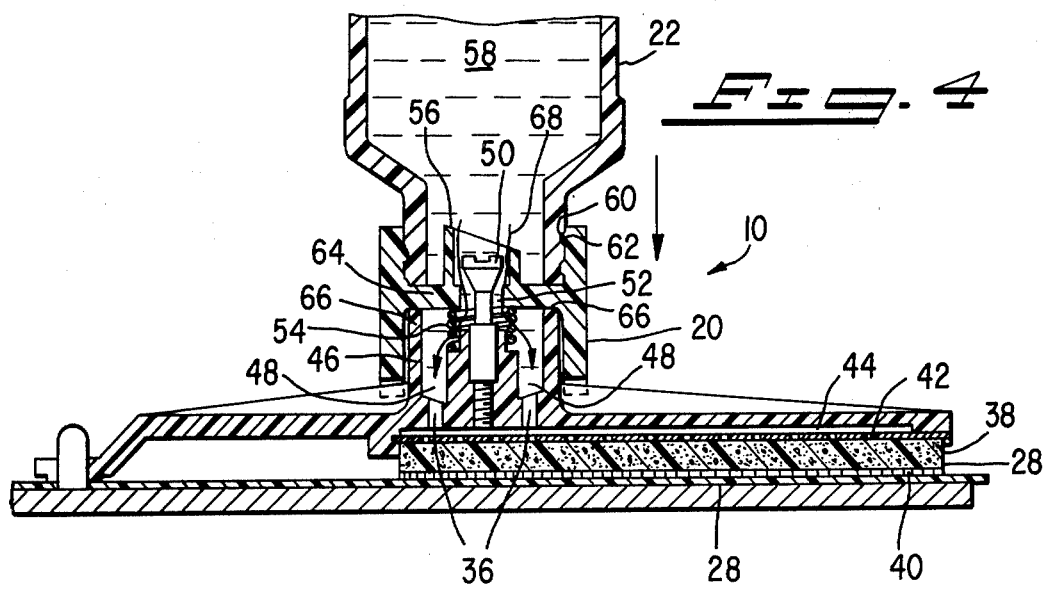
FIG. 4 is a second cut-away view of the device of the present invention further indicating the internal member thereof.

Referring now to FIGS. 3 and 4, one can see the internal members of the device 10 of the present invention. Referring to the cut-away view of the cleaning brush 28, one can see that brush 28 has a flexible urethane foam core 38, in the preferred embodiment, which is adapted to retain cleaning fluid therein. Foam core 38, which can be made of a variety of spongey materials, permits the cleaning fluid to exude outwardly therefrom, especially when pressure is applied thereto, such that the cleaning fluid flows to the bristles or brush heads 40. Brush heads 40 are adapted to enter into the grooves of a typical phonograph record and thereby remove undesired material therefrom. Brush heads 40 also apply the cleaning fluid to the grooves of the record which fluid and brush action also conditions record and renders it substantially static-free. One can see in FIG. 3 that the carrier 30 includes a plurality of openings 42 along the length thereof such that when the cleaning fluid is caused to flow through the arm 12, and more specifically, through a groove or space 44 formed in the arm 12, such cleaning fluid is permitted to enter through openings 42 along the length of the carrier 30. In this manner, the length of the entire cleaning brush 28 receives the cleaning fluid.

Referring again to FIGS. 3 and 4, valve housing 46 is shown as an upwardly extending cylindrically shaped member which houses the valve 47. The valve housing 46 forms two fluid ports 48 which are in axial alignment with openings 36. Fluid ports 48, when the valve 47 actuated, permit the cleaning fluid to pass through the valve housing 46 and into the arm member 12. The valve 47 includes an upwardly extending valve head 50 which extends into a port or valve seat 52 formed in the rotatable member 20. Because the valve head 50 engages valve seat 52 prior to being actuated, the cleaning fluid 58 in the reservoir 22 is not permitted to flow through the valve housing 46 and to the arm member 12.

Referring now to FIG. 4, one can see that the reservoir 22 has been depressed toward arm member 12 thus causing the valve head 50 to be disengaged from the valve seat 52, thereby permitting the cleaning fluid 48 to flow in the directions indicated by arrows 68. More specifically, the fluid 58 flows along the pathway formed by now-opened port 52 through fluid ports 48, through the openings 36 and along space 44 where it ultimately flows through openings 42 in the carrier 30. Once in carrier 30, the cleaning fluid 58 will exude to the brush heads 40.

To use the device 10 of the present invention, the fluid reservoir 22 containing the formulated cleaning and conditioning fluid 58 is placed on a surface and the device 10 is screwed onto the top thereof. While a wide variety of liquid reservoirs can be used, the liquid reservoir preferably used is one which includes a top having a membrane which maintains a liquid seal such that the ingredients, often volatile, are not permitted to escape. Referring to FIG. 4, one can see that the rotatable member 20, which has a generally circular and tubular configuration has thread members 62 which engage indentations 60 formed in the neck of the fluid reservoir 22. Of course, it is understood that other means for joining the reservoir 22 to the device 10 are within the scope of the present invention. In the preferred embodiment, however, the rotatable member 20 has an upwardly extending and pointed orifice 56 adapted to pierce the membrane (not shown) which previously capped the reservoir 22. In this manner, the reservoir 22 is easily and neatly opened by merely twisting the rotatable member 20 and the reservoir 22 together.

In its rest position, the device 10, and more specifically, the valve 47, is configured such that valve seat 52 engages valve head 50 so as to prevent any cleaning fluid 58 from reaching the cleaning brush 28. However, actuating the valve is achieved by merely depressing the reservoir 22 toward the arm member 12. When this is done, one can see that an inwardly extending ledge 64 integrally formed on the rotatable member 20 engages spring 54. When sufficient force is applied so as to overcome the action of spring 54, the valve seat 52 will disengage from the valve head 50 and fluid 58 will now be permitted to flow therethrough. It should be noted that when the rotatable member 20 is fully depressed, upper surface 66 of the valve housing 46 engages the inwardly extending ledge 64 so as to restrict the downward movement of the rotatable member 20. When one releases the reservoir 22, the force exerted by spring 54 on ledge 64 causes ledge 64 to proceed upward so as to reengage the valve head 50 with the valve seat 52 thus closing off the supply of fluid.

After the reservoir 22 is coupled to the device 10, and more specifically, to the valve housing 20, the notch 18 is brought into alignment with spindle 24 as shown in FIG. 1. Notch 18 acts as a locating keying means, although other alignment means are within the scope of the present invention. The reservoir 22 is then depressed, causing spring 54 to depress thus permitting the cleaning fluid 58 to gravity flow through the two fluid ports 48 formed in the valve housing 46, through openings 36 and along space 44. As the cleaning fluid 58 flows along space 44, it flows through openings 42 located in the carrier 30. The fluid is then retained in the foam core 38 with some oozing through the foam core into the brush heads 40.

When sufficient cleaning fluid 58 has been applied to the cleaning brush 28, the reservoir 22 is released and the spring action against ledge 64 will cause the rotatable member 20 and the reservoir 22 to return to their original positions. As described above, valve head 50 will again be seated in the valve seat 52 closing off the supply of cleaning fluid 58. With the device 10 in place as shown in FIG. 1, it is rotated about the record 26. Because valve head 50 also acts as a bearing in seat 52, the rotatable member 20 and the reservoir 22 attached thereto are permitted to rotate about the arm member 12 as the arm member 12, in turn, is rotated about record 26. The slight force caused by the fluid container on the foam core 38 causes additional small amounts of the cleaning fluid 58 to ooze out into the brush heads 40. The heads 50 extend into the grooves of the record 26 and thus particles of dirt, dust, and other undesirable material are caused to adhere to the brush heads 50 partly due to the cleaning fluid 58. The cleaning fluid 58 also acts as a conditioner/lubricant for the grooves and thus it has been found by using the device 10 of the present invention, less wear of the stylus on the record grooves is achieved. It is believed that the method of application achieved by device 10 produces complete and uniform application of the cleaning fluid 58 which helps achieve the improved wearability of record 26 as discussed hereinabove. Further, the device 10 and associated method of application cause a pronounced decrease in any static charge built up on the record 26 so as to render such record substantially static free. This helps prevent further buildup of dust attracted because of static electricity on the record 26.

Once the device 10 has been rotated a few times about the record 26, or the record is rotated automatically on the turntable while the cleaning device is stationary.

A stand or base (not shown) can also be used in connection with the present invention. Such stand or base permits the device 10 to be stored when not in use, and further absorbs any excess fluid to prevent dripping. In the preferred embodiment, the device is stored of the cleaning brush 28 facing down. This helps the brush 28 free from dirt and dust. and the grooves are substantially cleaned, the arm 12 is removed from its abutment with the spindle 24 and inverted so as to prevent any continued application of the cleaning fluid 58.

By the use of the device 10 described hereinabove, the cleaning fluid 58 is selectively applied in a manner which prevented undesired evaporation or leakage due to the uniquely designed valve system. However, the seal formed by valve head 50 and seat 52 can be further modified by including various sealing means such as O-rings, multiple lip seals and the like.

Further, since the device is positioned on the record 26 by using the turntable spindle 24, the brush heads 40 are kept in constant parallel and abutting relationship with the record 26. This enables the brush heads 40 to be brought into engagement with the record grooves in a circular and parallel manner as the device 10 is rotated. This has been found to be extremely desireable in cleaning and evenly applying the fluid. The device 10 also enables the cleaning fluid to be dispensed evenly by merely inserting the device 10 and pushing the reservoir 22 down towards the cleaning arm 12. It has been found, however, that arm 12 can be angled slightly so as to increase the gravity flow of the cleaning fluid 58 from an area generally located near the center of the arm 12 towards the first end 14 thereof.

Although this invention has been disclosed and described with reference to a particular embodiment, the principles involved are susceptible of other applications which will be apparent to persons skilled in the art. For example, in the preferred embodiment, the arm 12, the rotatable member 20, and the valve housing 46, are all made of plastic. Of course, other materials are also within the scope of the present invention. Further, while the present invention contemplates the use of a spring loaded valve 47, other similar valving systems are also within the scope of the invention. Finally, the preferred embodiment contemplates the actuation of valve 47 by means of depressing the reservoir 22. Such a system could be modified whereby the valve is actuated by a twisting action, lifting action, and the like. This invention, therefore, is not intended to be limited to the particular embodiment herein disclosed.

What is claimed is:
1. A record cleaning device comprising:
   an elongated arm member having cleaning means disposed on one side thereof, said cleaning means for engaging and cleaning the surface of a record so as to remove dirt and other undesirable material therefrom;
   a rotatable member coupled to said arm member such that said device can be selectively rotated about a record to be cleaned;
   a cleaning fluid reservoir coupled to said rotatable member for supplying said cleaning means with a cleaning fluid; and
   valve means disposed in said rotatable member for regulating the flow of said cleaning fluid to said cleaning means.
2. A record cleaning device according to claim 1 wherein said cleaning means comprises a plurality of outwardly extending brush heads configured to fit within the groove of said record.
3. A record cleaning device according to claim 2 wherein said cleaning means is disposed on a removable carrier, said carrier permitting said cleaning fluid to pass therethrough.
4. A record cleaning device according to claim 1 wherein said valve member includes a valve head and a spring member, said spring member urging said valve head to engage said rotatable member thereby selectively preventing said cleaning fluid from flowing to said cleaning means.

5. A record cleaning device according to claim 4 wherein said rotatable member, when depressed, causes said valve head to disengage said rotatable member thereby permitting said cleaning fluid to flow to said cleaning means.

6. A record cleaning device for removing dirt, dust, and other undesirable material from the surface of a record comprising:

an elongated arm member having a cleaning brush disposed on one side thereof, said cleaning brush having a foam core and outwardly extending bristles, and being mounted in an associated carrier, said carrier removably disposed on said arm member and having a plurality of holes passing therethrough so as to permit a cleaning fluid to enter said foam core and to flow to said bristles;

a rotatable member coupled to said arm member such that said device can be selectively rotated about a record to be cleaned;

a cleaning fluid reservoir coupled to said rotatable member supplying said cleaning brush with a cleaning fluid; and valve means axially disposed in said rotatable member for regulating the flow of said cleaning fluid to said cleaning brush, said valve means including a valve head selectively engaging said rotatable member.

7. A record cleaning device according to claim 6 wherein said arm member forms a channel adjacent said brush carrier such that said cleaning liquid is directed in said channel and is thereby encouraged to flow through said brush carrier along the length thereof.

8. A record cleaning device according to claim 6 wherein said rotatable member, when depressed, causes said valve head to disengage said rotatable member thereby permitting said cleaning fluid to flow to said cleaning brush.

9. A record cleaning device according to claim 6 wherein said arm member includes means for joining said arm member to a spindle of a record player.

* * * * *